Figure 1:
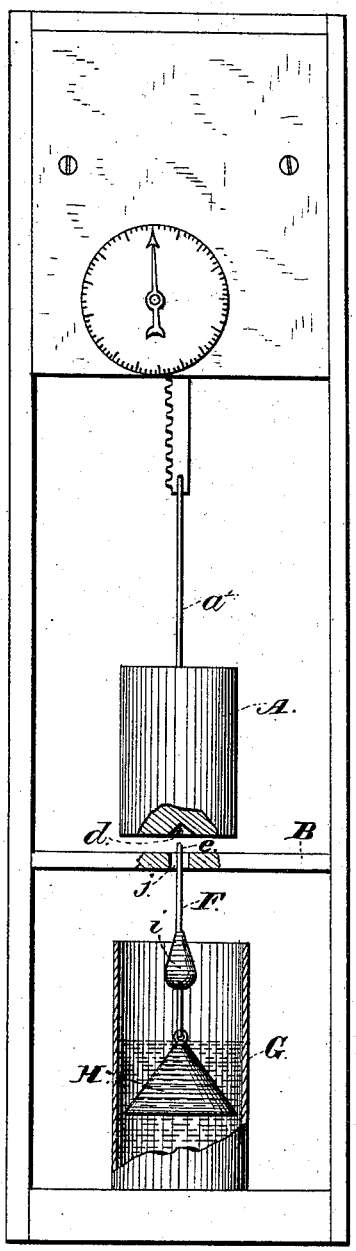

D. T. WINTER.
Device for Preventing Vibration of Pointers of Scale Dials.

No. 231,741.          Patented Aug. 31, 1880.

Witnesses:
Franck L. Ourand
Penn. Halsted

Inventor:
David Thomas Winter
by John J. Halsted
Atty.

UNITED STATES PATENT OFFICE.

DAVID T. WINTER, OF PEABODY, MASSACHUSETTS, ASSIGNOR OF ONE-HALF OF HIS RIGHT TO CHARLES E. TEAGUE, OF SAME PLACE.

DEVICE FOR PREVENTING VIBRATIONS OF POINTERS OF SCALE-DIALS.

SPECIFICATION forming part of Letters Patent No. 231,741, dated August 31, 1880.

Application filed February 14, 1880.

*To all whom it may concern:*

Be it known that I, DAVID THOMAS WINTER, of Peabody, in the county of Essex and State of Massachusetts, have invented certain new and useful Improvements in Machines for Measuring, Weighing, and Kindred Purposes; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention is applicable to machines in which a spring-balance is used, or in which the pointer or index-hand is liable from any cause, when moved from one point to another upon the dial or scale, to vibrate before coming to a state of rest; and the object of this invention is to prevent or to stop such vibration as instantaneously as possible at the proper indicating-point, so that the measure or weight (as the case may be) may be at once ascertained without waiting, as heretofore has been necessary in every instance, for the vibrations to cease and the pointer or index-hand to settle and be in repose.

The invention may be said to consist, in general, in an apparatus not necessarily connected to the machine, but distinct therefrom and adapted to be secured to the floor of a room or to any fixed object in proximity to the machine with which it is to be used; this apparatus being constituted of a vessel or cylinder partially filled with liquid, and having therein a buoyant or air-tight body of somewhat lesser specific gravity than the liquid, and from which disk or body a rod free at its upper end extends upward and through and about the mouth of the vessel, this free upper end being, by reason of the buoyancy of such disk or body, normally at its highest point until forced down, as hereinafter stated, at the proper period by a descending part of the measuring-machine coming in contact therewith just about at the moment when the measurement has been effected. The buoy and its rod are entirely released or set free again upon the upward movement of the device, which may have pressed it down, and then they rise again of their own action because of such buoyancy. The effect of this downward motion of the rod and its buoy, when in contact with the machine which actuates it, is to counteract or neutralize the momentum of the movable table, beam, or lever of the machine, and thereby to cause the spring of the balance to remain at its proper place, and consequently to leave the pointer or index-hand at its proper place on the scale or dial.

Although, as above indicated, the invention is not limited to any one or more kinds of machine, but is applicable to a very large class, I will, by way of illustration, proceed to describe it as applied to a skin measuring and weighing machine—say, for instance, of the general structure shown in my Patent No. 215,853, dated May 27, 1879—again remarking that it is applicable to all machines in which a spring-balance is used.

In the accompanying drawings, the weight A in Figure 1 is merely representative, and indicates the position of a portion of the front part of the upper or rising-and-falling weighted table, the motions of which, by any appropriate connection, $a'$, induce the ultimate action of the spring-balance and indicator. B is a portion of the front part of the stationary lower or slotted table, these parts being of any known construction.

Figure 2:
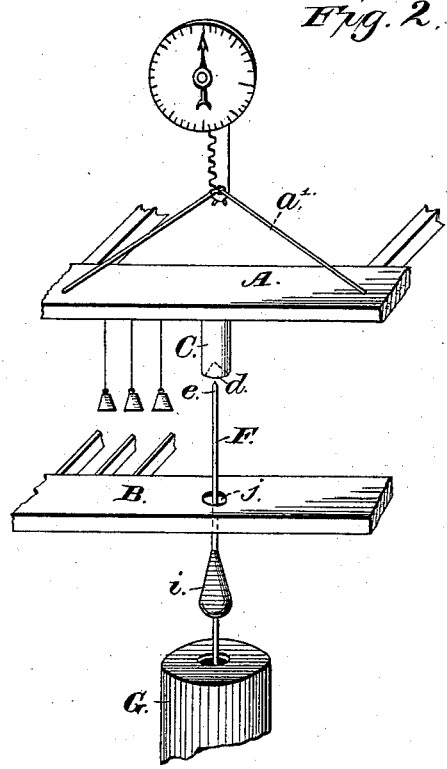

Referring to Fig. 1, the weighted part A or (referring to Fig. 2) any downwardly-projecting part C of the table has its lower end preferably concaved, as shown at $d$, to admit at the proper period the uppermost end or tip, $e$, of the shaft F, presently to be described.

G is a cylinder or vessel partially filled with water or other liquid, as shown. H is an air-tight or buoyant or partially buoyant disk, body, or valve, preferably cone-shaped, to allow it to rise easily in the liquid when pressure on the rod or shaft F is removed, and having its broad base at its under side so as to meet with considerable yielding resistance from the water or liquid when the rod and its attached valve H are pushed downward. Any appropriate weight or counterpoise, $i$, may be placed on the rod F to establish the desired degree of buoyancy of the valve, and this part *i* may also serve to limit the vertical play or movement of the rod by making it of such dimensions relatively to the opening in the top of the vessel (in case such opening be smaller than the part *i*) and to the passage *j* in the lower table that it cannot pass through either of them.

The valve H should, of course, be of such size as to permit it to be moved freely up and down in the vessel. Its bottom, therefore, should be about one-sixteenth or one-eighth of an inch less in diameter than the inside of the vessel.

In practice the upper table is pulled down for a measurement, (say of a skin or hide,) and then, instead of being obliged to steady it, as heretofore, I allow the concave or countersink *d* to rest on the top of the shaft or wire F, the other end of which connects with the disk, air-chamber, or valve H.

As the descending weight or force presses the device H downward in the water, forcing above it the water that was beneath it, the time that is occupied in this action arrests the momentum of the table or beam, pulls the spring of the balance out to where it ought to be, and it then remains there, and the measurement or weight is correctly indicated without the customary and hitherto unavoidable vibrations. The advantage of such stoppages of the vibrations is of very great importance in economy of time, especially where a machine is in constant or frequent use, measuring or weighing thousands of times per day, as a considerable saving of time is effected at each of these times, and practically, therefore, the use and efficiency of the machine may be said to be doubled or more than doubled, and at the same time a surer and more accurate measurement or weight is obtained, as the operator is not tempted to make an approximate guess rather than wait for the hand or indicator to cease its vibrations.

The vessel G should be secured to a stationary bed or base, K.

The valve or float is used to cause the rod or shaft F to return to its original position when the weight is removed, as I prefer to use it in its downward motion alone on my measuring-machine, placing it in front of the machine; but it will be evident that a flat disk — as, for instance, the bottom of the valve—would be all that would be required if the rod, which is fastened in its center, were connected by socket-joints at its upper end, directly or indirectly, to the spring-balance. It would then act each way—that is, on the upward and on the downward motion—and in this way it is adaptable to other mechanism, or even to a common scale with a spring-balance and indicator.

I claim—

1. In combination with a machine adapted for measuring skins or other regular or irregular surfaces, a detached liquid-containing vessel adapted to be secured to the floor of the room or to any permanent bed not a part of the machine, and having therein a buoyant body with an upwardly-projecting rod, the latter being not connected to the machine, but in position to be brought into contact with a movable part thereof, substantially as shown and described.

2. In combination with the vessel G, a buoyant body, H, having the rod F projecting upward therefrom, the upper part of said rod being free and provided with a counterpoise, *i*, adapted also to serve as a stop, substantially as shown and described.

DAVID THOMAS WINTER.

Witnesses:
GEORGE F. SAUGA,
CHAS. E. TEAGUE.